United States Patent

Lynch et al.

Patent Number: 6,148,245
Date of Patent: Nov. 14, 2000

[54] METHOD AND APPARATUS FOR SHARING PROCESSING INFORMATION IN A MANUFACTURING FACILITY

[75] Inventors: Michael P. Lynch, Boca Raton; Chin-Shu Lee, Lake Worth; Gary Slavin, Delray Beach, all of Fla.

[73] Assignee: Motorola, Schaumburg, Ill.

[21] Appl. No.: 08/327,347

[22] Filed: Oct. 21, 1994

Related U.S. Application Data

[63] Continuation of application No. 08/017,173, Feb. 12, 1993, abandoned.

[51] Int. Cl.[7] .................................................. G06F 19/00
[52] U.S. Cl. ..................... 700/115; 700/225; 700/116; 700/4; 29/791
[58] Field of Search ..................... 29/701, 729, 739, 29/791, 793, 794, 700; 700/95, 115, 116, 213, 225, 2, 3, 4, 82

[56] References Cited

U.S. PATENT DOCUMENTS

| | | | |
|---|---|---|---|
| 4,332,012 | 5/1982 | Sekine et al. | 364/468 |
| 4,611,380 | 9/1986 | Abe et al. | 29/430 |
| 4,683,540 | 7/1987 | Kurosu et al. | 364/468 |
| 4,827,423 | 5/1989 | Beasley et al. | 364/468 |
| 4,841,431 | 6/1989 | Takagi et al. | 364/187 |
| 4,870,590 | 9/1989 | Kawata et al. | 364/468 |
| 5,056,028 | 10/1991 | Ohta et al. | 364/468 |
| 5,150,288 | 9/1992 | Imai et al. | 364/132 |
| 5,241,482 | 8/1993 | Iida et al. | 364/468 |
| 5,255,197 | 10/1993 | Iida | 364/468 |
| 5,262,954 | 11/1993 | Fujino et al. | 364/468 |

*Primary Examiner*—Paul P. Gordon
*Attorney, Agent, or Firm*—James A. Lamb

[57] ABSTRACT

A line controller (115) for controlling a manufacturing process comprises a data entry device (225) for receiving product identification information and determining circuitry (310, 315) coupled to the data entry device (225) for receiving the product identification information and determining whether the product identification information is indicative of a first product or a second product. A control unit (320) coupled to the determining circuitry (310, 315) automatically generates, in response to the determining circuitry (310, 315) determining that the product identification information is indicative of the second product, a request for information relevant to the processing of the second product. The line controller (115) further comprises a data port (330) coupled to the control unit (320) for transmitting the request and for receiving in response thereto the information.

13 Claims, 5 Drawing Sheets

METHOD AND APPARATUS FOR SHARING PROCESSING INFORMATION IN A MANUFACTURING FACILITY

This is a continuation of application Ser. No. 08/017,173, filed Feb. 12, 1993, now abandoned.

FIELD OF THE INVENTION

This invention relates in general to manufacturing facilities, and more specifically to a method and apparatus for sharing processing information in a manufacturing facility.

BACKGROUND OF THE INVENTION

In many conventional manufacturing facilities, products are manufactured on assembly lines. Typically, to avoid confusion and for better efficiency, each assembly line is utilized to manufacture a single product and may be either automated or manual, or a combination of the two.

Before processing a product, necessary information and parts are usually gathered for preparation of the assembly line. By way of example, a list may be compiled specifying the parts, e.g., electrical components, housings, labels, etc., which are to be assembled to form the product. Additionally, a set of instructions may be prepared which summarizes the assembly steps and instructions for performing the various steps. For instance, in a soldering process, parts to be soldered to a printed circuit board might be listed by part number, color, or shape. If instructions are included, the instructions might call for a particular part to be soldered in a specific orientation. Relevant information is then furnished to human operators, for manual assembly processes, or automated equipment, for automated assembly processes.

Typically, information relevant to the processing of a product is stored in a computing device, referred to as a line controller, which controls a single assembly line. This processing information, which might be a parts listing and instructions, is programmed into the line controller and subsequently furnished by the line controller to human operators and/or automated equipment, depending on the type of assembly line. If the assembly line thereafter processes a different product, processing information corresponding to the different product must be gathered and manually programmed into the line controller for the assembly line. Therefore, when more than one product is to be processed on a single assembly line, time is wasted during which processing information must be manually programmed into the line controller. This results in higher manufacturing costs, which are usually passed on to the consumer as higher product costs.

Thus, what is needed is an improved method for processing more than one product on a single assembly line. Additionally, the method should not necessitate the manual reprogramming of a line controller controlling the assembly line.

SUMMARY OF THE INVENTION

According to a first aspect of the present invention, a method for processing first and second products in a manufacturing facility comprising first and second assembly lines controlled, respectively, by first and second line controllers comprises the steps of the first line controller receiving product identification information and determining whether the product identification information is indicative of the first product or the second product. The method further comprises the step of the first line controller automatically retrieving, in response to determining that the product identification information is indicative of the second product, information relevant to the processing of the second product from the second line controller.

According to a second aspect of the present invention, a line controller for controlling a manufacturing process comprises a data entry device for receiving product identification information and determining circuitry coupled to the data entry device for receiving the product identification information and determining whether the product identification information is indicative of a first product or a second product. A control unit coupled to the determining circuitry automatically generates, in response to the determining circuitry determining that the product identification information is indicative of the second product, a request for information, wherein the information is relevant to the processing of the second product. The line controller further comprises a data port coupled to the control unit for transmitting the request and for receiving in response thereto the information.

DESCRIPTION OF A PREFERRED EMBODIMENT

Figure 1:
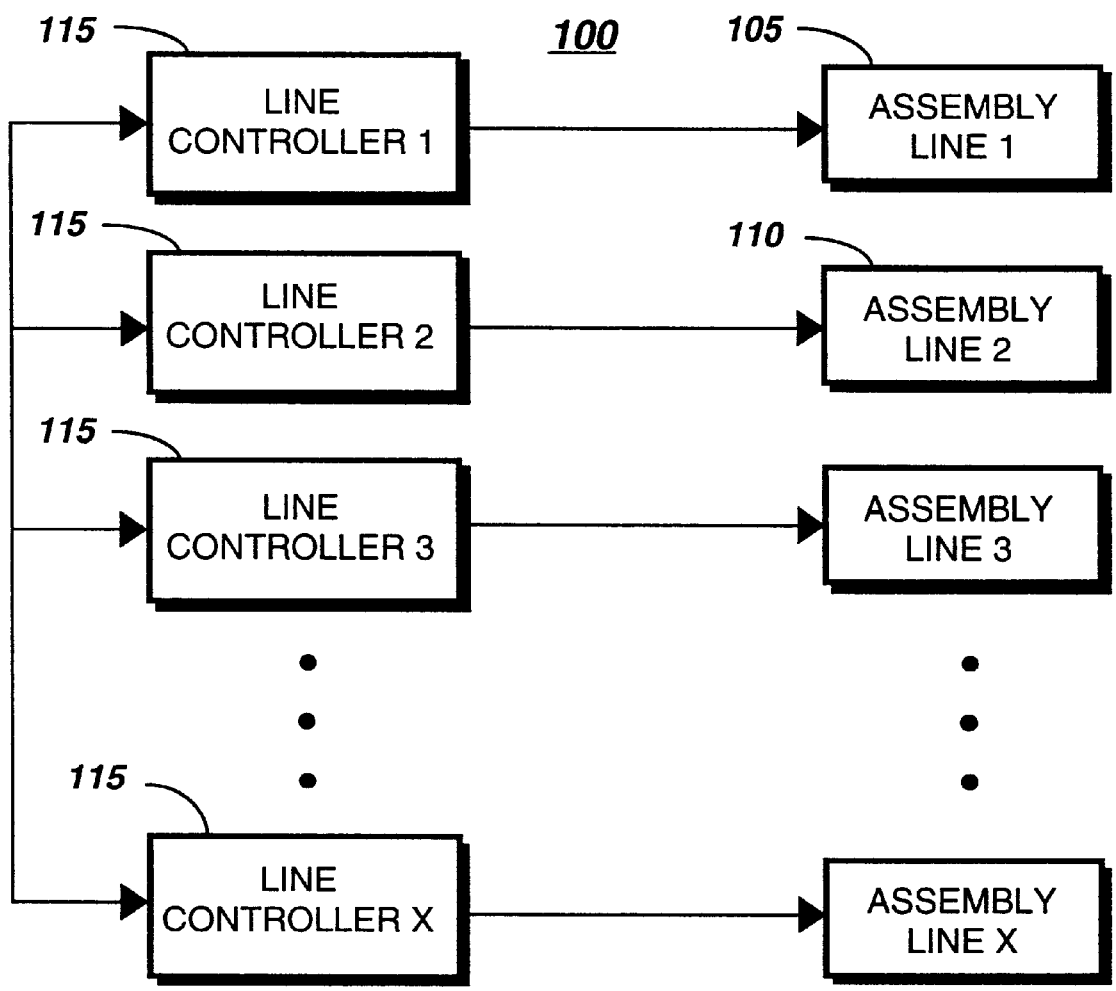
FIG. 1 is a block diagram of a manufacturing facility in which a plurality of assembly lines are controlled by line controllers in accordance with a preferred embodiment of the present invention.

FIG. 1 is a block diagram of a manufacturing facility 100 in accordance with the preferred embodiment of the present invention. As shown, the manufacturing facility 100 includes a plurality of assembly lines for processing different products. By way of example, the first assembly line 105 may normally process a receiver board for use in an electronic device, e.g., a selective call receiver, while the second assembly line 110 normally processes a decoder board. The assembly lines are preferably controlled by line controllers 115, each of which are coupled to a single assembly line. Each line controller 115 stores and coordinates processing information relevant to the processing of the product normally processed on the corresponding assembly line. Additionally, according to the present invention, the line controllers 115 are coupled together such that processing information for different products can be distributed among the line controllers 115. In this manner, the assembly lines can be advantageously utilized to process different products in addition to those that are normally processed.

Figure 2:
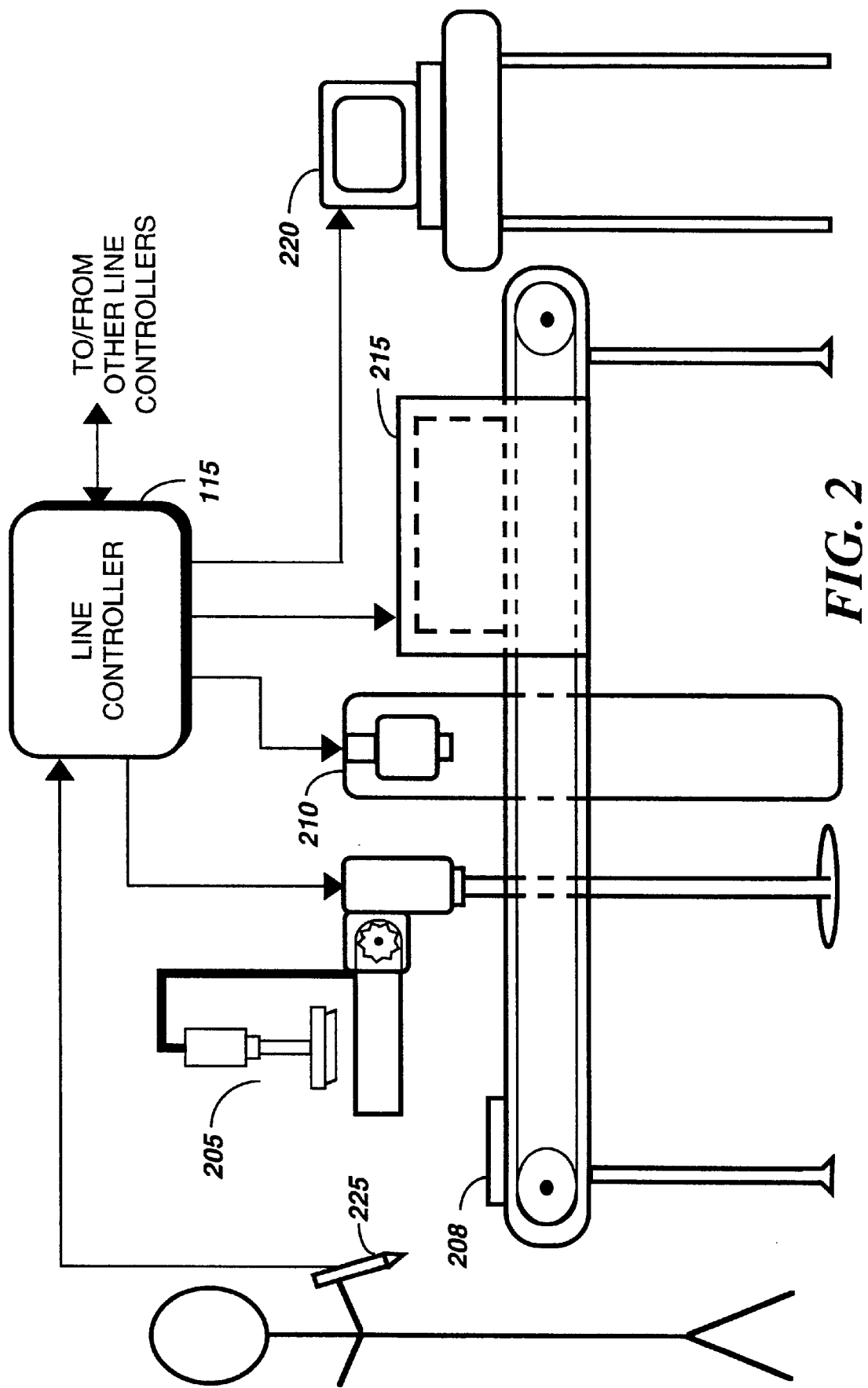
FIG. 2 is an illustration of assembly line equipment which receives processing information from a line controller of FIG. 1 in accordance with the preferred embodiment of the present invention.

With reference to FIG. 2, an example of assembly line equipment utilized to process a product, such as a receiver board, is shown. The assembly line equipment is controlled by a line controller 115 in accordance with the preferred embodiment of the present invention. The assembly line comprises a solder printer 205 for selectively applying solder paste to a receiver board 208, automated placement equipment 210 for populating the receiver board 208 with electrical components, e.g., resistors, capacitors, etc., and a reflow oven 215 for heating the receiver board 208 to electrically couple the electrical components to the receiver board 208. Additionally, a computer 220 provides a visual display of information, such as a set of instructions, to aid a human operator in performing manual processes. The human operator may, for example, manually solder or otherwise assemble additional components to the receiver board 208 to complete the processing of the receiver board 208 in accordance with the displayed instructions.

According to the present invention, the line controller 115 provides the assembly line equipment with processing information relevant to the processing of the receiver board 208. Initially, the line controller 115 receives, via a data entry device 225, product identification information (ID) indicating which product is to be processed. The data entry device 225 might be, for instance, a scanning wand, as shown, for scanning a bar code or other information imprinted upon the product. Additionally, the data entry device 225 might be a keyboard by which data is entered into the line controller 115. The line controller 115 determines from the product ID whether or not the product, e.g., the receiver board 208, is a product that is normally processed on the assembly line. When the receiver board 208 is normally processed on the assembly line, the line controller 115 retrieves the processing information from internal memory. When the receiver board 208 is not normally processed on the assembly line, the line controller 115 automatically retrieves the processing information from another line controller within the manufacturing facility 100 that normally processes the receiver board 208. In this manner, the line controller 115, and other line controllers within the manufacturing facility 100, can easily access processing information for all products manufactured in the facility 100. As a result, time is not wasted in which processing information for a different product is manually programmed into line controllers.

For the example assembly line shown in FIG. 2, the line controller 115 utilizes the processing information to provide necessary data to the assembly line equipment. Preferably, the line controller 115 provides orientation information, comprising receiver board features, such as fiducials, to the solder printer 205 such that the solder printer 205 can correctly align a stencil with the receiver board 208 prior to applying the solder paste. The line controller 115 also furnishes the automated placement equipment 210 with information such as a list of parts to be placed on the receiver board 208 and their sizes and shapes. If the receiver board 208 is populated with fragile components, the reflow oven 215 may receive from the line controller 115 a temperature profile for heating the receiver board 208. Additionally, if manual operations are to be performed on the receiver board 208, a set of instructions are preferably provided by the line controller 115 for visual display on the monitor of a computer 220. The set of instructions may, for example, include a list of parts, such as an antenna or a label, to be assembled to the receiver board 208.

It may be appreciated by one of ordinary skill in the art that the above described example is for description purposes only and that the line controller 115 may be used to coordinate the manufacture of products on many different types of assembly lines. An assembly line may, for instance, rely entirely upon human operators who receive assembly instructions from the line controller 115.

Figure 3:
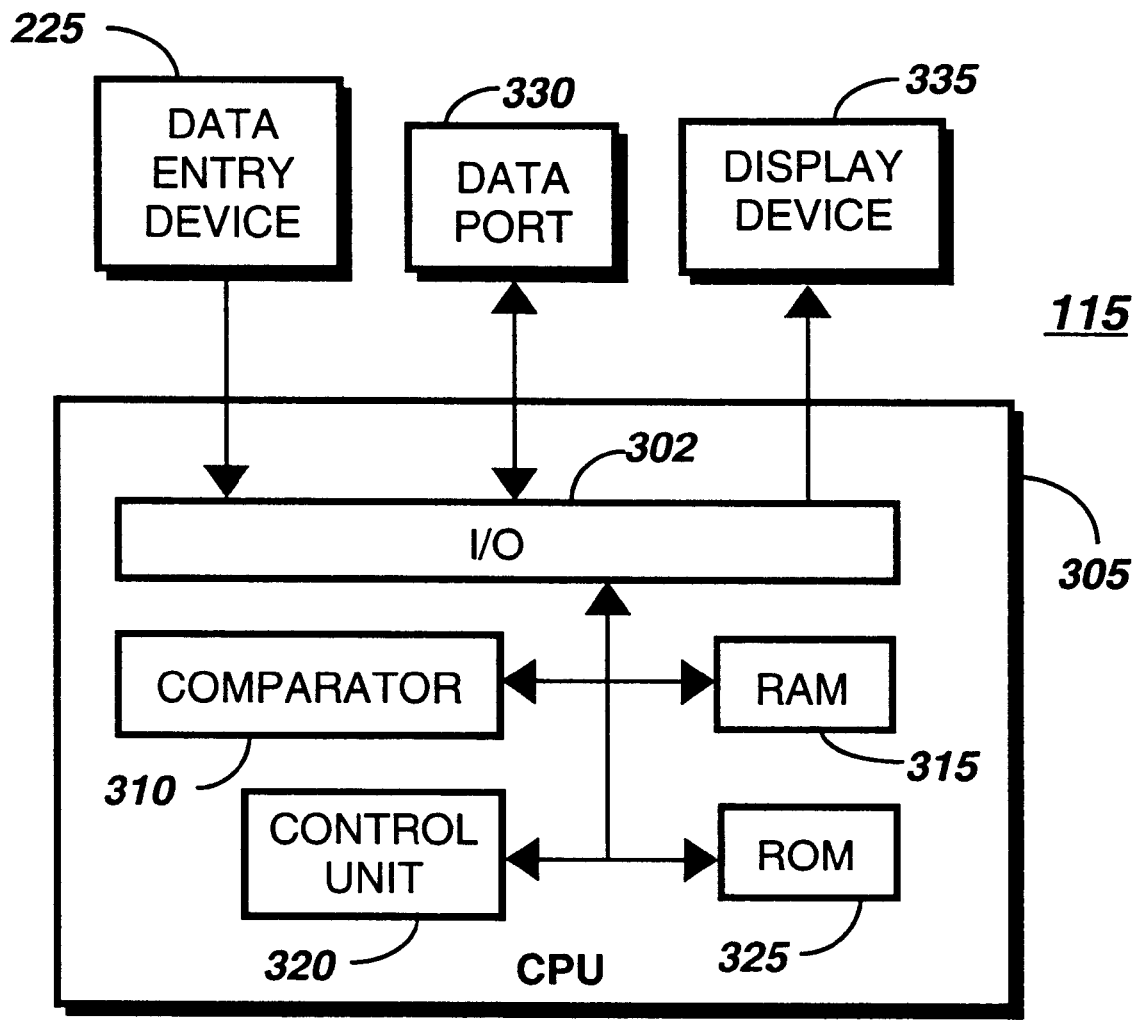
FIG. 3 is an electrical block diagram of a line controller of FIG. 1 in accordance with the preferred embodiment of the present invention.

With reference to FIG. 3, an electrical block diagram of the line controller 115 is depicted. In accordance with the preferred embodiment of the present invention, the line controller 115 comprises a data entry device 225, as mentioned above, for receiving a product ID. The data entry device 225 is coupled, via an input/output bus (I/O) 302, to a central processing unit (CPU) 305 for controlling the operation of the line controller 115. The CPU 305 comprises a comparator 310 for receiving the product ID and comparing the product ID to values stored in a local memory, such as a random access memory (RAM) 315, to determine the product indicated by the product ID. The CPU 305 further comprises a control unit 320 which operates in accordance with preprogrammed subroutines stored in a read only memory (ROM) 325, such as an electrically erasable programmable read only memory (EEPROM).

Preferably, the control unit 320 provides processing information relevant to the processing of a product to a data port 330 for transmission to the assembly line coupled to the line controller 115. This processing information is retrieved from the RAM 315 when the comparator 310 determines that the product ID is indicative of a product normally processed on the assembly line. Alternatively, when the product ID indicates that the product is not normally processed on the assembly line, the product information is retrieved, via the data port 330, from another line controller within the manufacturing facility 100 (FIG. 1). A display device 335 is preferably coupled to the I/O 302 for receiving and displaying data pertinent to the processing of the product.

Figure 4:
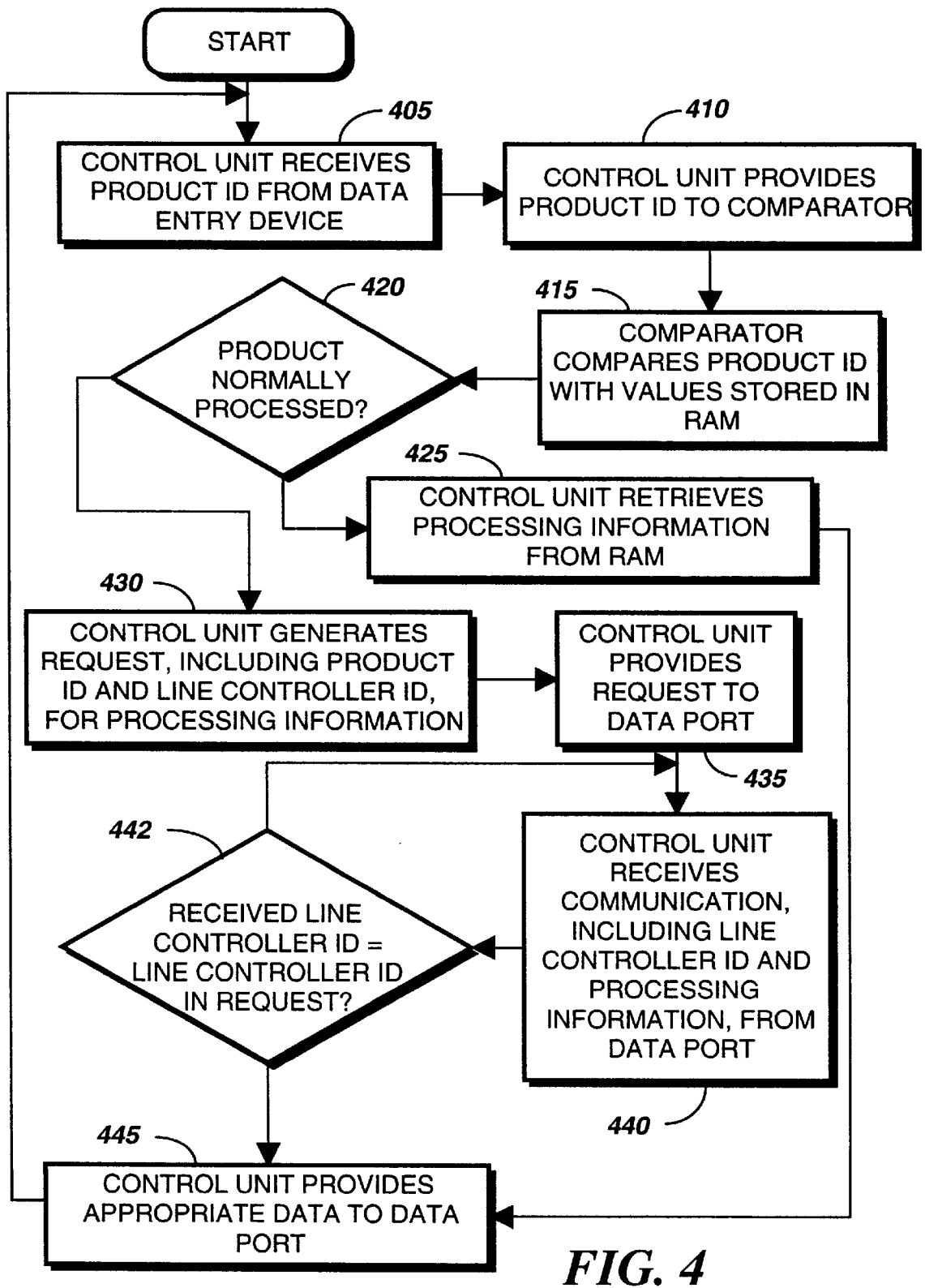
FIG. 4 is a flowchart depicting the operation of the central processing unit included within the line controller of FIG. 3 in accordance with the preferred embodiment of the present invention.

Referring next to FIG. 4, a flowchart illustrates the operation of the line controller CPU 305. In accordance with the preferred embodiment of the present invention, the control unit 320 (FIG. 3) of the CPU 305 receives, at step 405, a product ID from the data entry device 225 and provides, at step 410, the product ID to the comparator 310. Thereafter, at step 415, the comparator 310 compares the product ID with values stored in the RAM 315 to determine, at step 420, whether the product ID is indicative of a product normally processed on the assembly line. When the product is normally processed on the assembly line, the control unit 320 retrieves, at step 425, processing information associated with the product from the RAM 315.

When the product is not normally processed on the assembly line, the control unit 320 automatically generates, at step 430, a request for the processing information for the product. The request preferably comprises the product ID and a line controller ID associated with the requesting line controller 115. The request is provided, at step 435, to the data port 330 for transmission therefrom. Other line controllers within the manufacturing facility 100 (FIG. 1) receive the request, and the line controller which normally processes the product transmits the correct processing information to the data port 330 (FIG. 3). The control unit 320 thereafter receives, at step 440, a communication comprising the processing information and the line controller ID. The received line controller ID is then compared, at step 442, with values stored in the RAM 315 to determine whether the communication is intended for reception by the line controller 115. Once the control unit 320 has accessed the correct processing information, appropriate data, such as a parts list or instructions, is generated, at step 445, for transmission from the data port 330 to equipment on the assembly line.

It may be appreciated by one of ordinary skill in the art that, in an alternate embodiment of the present invention, each line controller may further store information detailing each product normally processed by each of the other line controllers. In this alternate embodiment, a requesting line controller may, rather than broadcasting a request, simply transmit the request to a specific line controller. The targeted line controller may recognize an ID, or, if the line controllers each have dedicated ports coupled to the other line controllers, no ID may be necessary.

Figure 5:
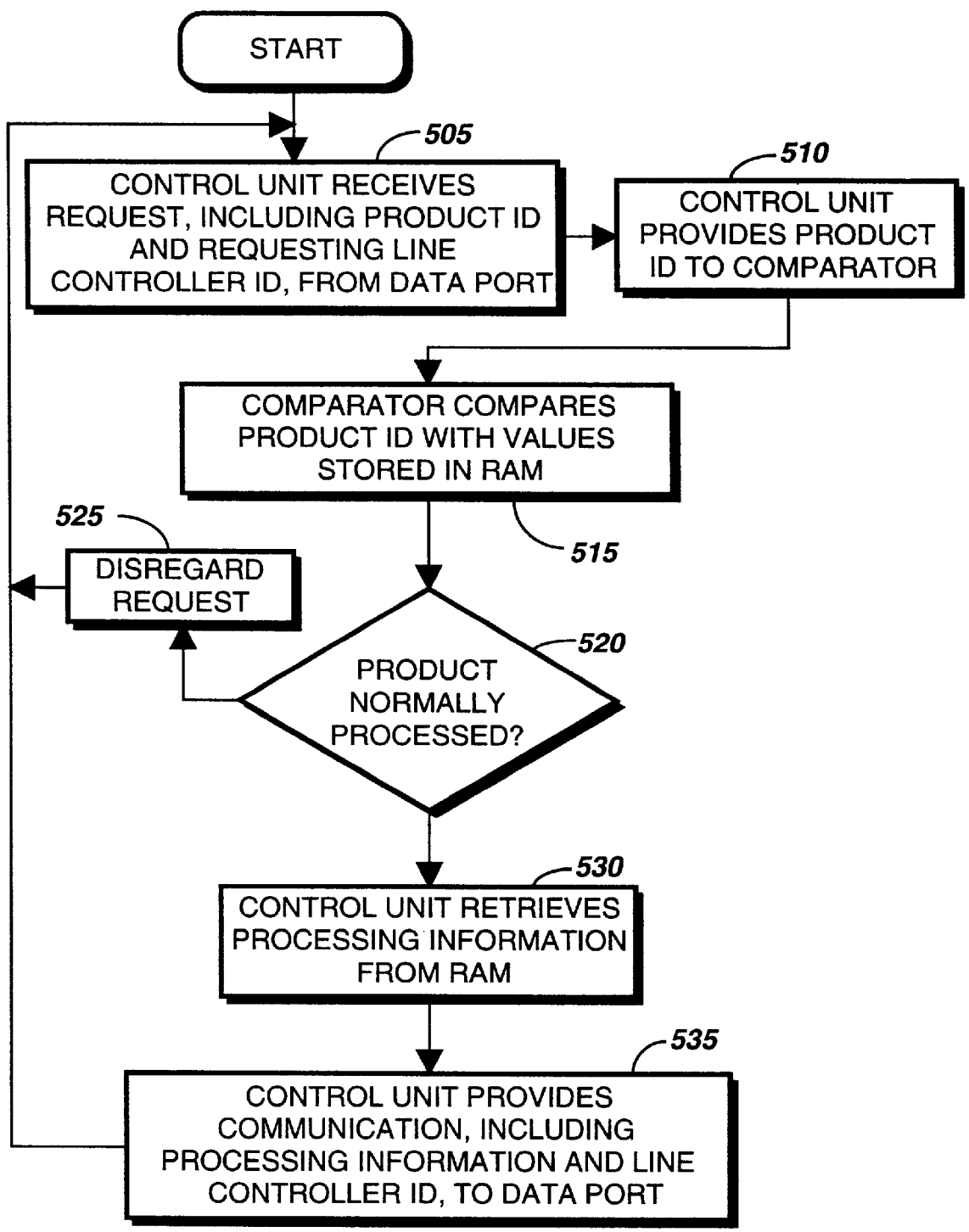
FIG. 5 is a flowchart depicting the further operation of the central processing unit included within the line controller of FIG. 3 in accordance with the preferred embodiment of the present invention.

FIG. 5 illustrates the further operation of the CPU 305 in which the line controller 115 receives a request for processing information from another line controller within the manufacturing facility 100. In accordance with the preferred embodiment of the present invention, the control unit 320 receives, at step 505, a request including a product ID and a line controller ID associated with the requesting line controller. In response to reception of the request, the control unit 320, at step 510, provides the product ID to the comparator 310, which compares, at step 515, the product ID with values stored in the RAM 315. When it is determined, at step 520, that the product ID is not indicative of a product normally processed by the line controller 115, the request is disregarded, at step 525.

When the product ID is indicative of a product normally processed by the line controller 115, the control unit 320 retrieves, at step 530, the processing information from the RAM 315. Subsequently, the control unit 320 transmits, at step 535, a communication comprising the line controller ID and the processing information to the data port 330 for transmission therefrom to the requesting line controller.

In summary, the manufacturing facility as described above includes a plurality of line controllers that are coupled such that processing information for products manufactured in the facility can be distributed from one line controller to another. Therefore, a line controller that controls an assembly line which normally processes a single product can conveniently access the processing information for other products stored in other line controllers. As a result, when a product that is not normally processed on the assembly line is recognized by the line controller, the line controller can retrieve the appropriate processing information from another line controller and generate therefrom data which is to be transmitted to equipment on the assembly line. In this manner, a single assembly line can be advantageously utilized to process more than one product, thus increasing the efficiency of the manufacturing facility without wasting valuable time in manually reprogramming the line controllers. This is especially advantageous, for example, in situations in which a first line controller is working at maximum capacity and a second line controller is available to assist the first line controller in processing a specific product.

Conversely, in conventional manufacturing facilities, line controllers for controlling assembly lines are not able to share processing information stored internally by the line controllers. Therefore, when a different product is to be processed on an assembly line, the line controller controlling the assembly line must be manually reprogrammed with the correct processing information, thereby wasting time. This wasted time is reflected in increased manufacturing costs.

It may be appreciated by now that there has been provided an improved method for processing more than one product on a single assembly line that does not require the time-consuming reprogramming of line controllers.

What is claimed is:

1. A method for processing products of first and second types, each different than the other, in a manufacturing facility comprising a first assembly line for normally processing the first type of product and for storing first processing information relevant to the processing of the first type of product, the manufacturing facility further comprising a second assembly line for normally processing the second type of product and for storing second processing information relevant to the processing of the second type of product, wherein the first and second assembly lines are controlled, respectively, by first and second line controllers, the method comprising the steps of:

the first line controller receiving a first product and reading product identification information therefrom;

the first line controller determining whether the product identification information associated with the first product is indicative of the first type of product or of the second type of product without referencing any information other than that stored by the first line controller;

the first line controller utilizing the first processing information stored therein for independently processing, without reference to any information other than that stored by the first line controller, the first product in response to determining that the first product is of the first type;

the first line controller automatically retrieving, in response to determining that the first product is of the second type, the second processing information from the second line controller in which the second processing information is stored; and the first line controller utilizing the second processing information for processing the first product in response to determining that the first product is of the second type and subsequent to retrieving the second processing information.

2. The method according to claim 1, wherein the retrieving step comprises the steps of:

the first line controller automatically transmitting, in response to determining that the product identification information is indicative of the second type of product, a request for the second processing information;

the second line controller receiving the request;

the second line controller, in response to reception of the request, transmitting the second processing information to the first line controller; and the first line controller receiving, in response to the request, the second processing information from the second line controller.

3. The method according to claim 1, further comprising the steps of:

the second line controller receiving a second product and reading product identification information therefrom;

the second line controller determining whether the product identification information associated with the second product is indicative of the first type of product or of the second type of product without referencing any information other than that stored by the second line controller the second line controller utilizing the second processing information stored therein for independently processing, without reference to any information other than that stored by the second line controller, the second product in response to determining that the second product is of the second type;

the second line controller automatically retrieving, in response to determining that the second product is of the first type, the first processing information from the first line controller in which the first processing information is stored; and the second line controller utilizing the first processing information for processing the second product in response to determining that the second product is of the first type and subsequent to retrieving the first processing information.

4. The method according to claim 3, wherein the step of the first line controller utilizing the first processing information for processing the first product and the step of the second line controller utilizing the second processing information for processing the second product can occur substantially coincident in time.

5. The method according to claim 3, wherein the step of the first line controller utilizing the second processing information for processing the first product and the step of the second line controller utilizing the first processing information for processing the second product can occur substantially coincident in time.

6. A manufacturing facility for processing first and second types of products, each different from the other, the manufacturing facility comprising:

a first line controller for storing first processing information relevant to the processing of the first type of product, the first line controller comprising first determining means for independently determining whether a product received thereby is of the first type or of the second type without referencing any information other than that stored by the first line controller;

a first assembly line coupled to and controlled by the first line controller for independently processing, without reference to any other information other than that stored by the first line controller, the first type of product in accordance with the first processing information and for processing the second type of product in accordance with second processing information relevant to the processing of the second type of product;

a second line controller coupled to the first line controller for storing the second processing information relevant to the processing of the second type of product, the second line controller comprising second determining means for independently determining whether a product received thereby is of the first type or of the second type without referencing any information other than that stored by the second line controller;

a second assembly line coupled to and controlled by the second line controller for independently processing, without reference to any information other than that stored by the first line controller, the first type of product in accordance with the first processing information and for processing the second type of product in accordance with the second processing information;

wherein, in response to reception of a product of the second type, the first line controller automatically retrieves the second processing information from the second line controller;

wherein, in response to reception of a product of the first type, the second line controller automatically retrieves the first processing information from the first line controller; and wherein processing on the first assembly line is unrelated to processing on the second assembly line.

7. The manufacturing facility according to claim 6, further comprising communication means coupled between the first and second line controllers over which the first processing information is provided, as recuested, to the second line controller and over which the second processing information is provided, as requested, to the first line controller.

8. The manufacturing facility according to claim 6, wherein the first line controller comprises a device for reading product identification information associated with the product received thereby.

9. The manufacturing facility according to claim 6, wherein the second line controller comprises a device for reading product identification information associated with the product received thereby.

10. The manufacturing facility according to claim 6, wherein the first line controller comprises:

a device for reading product identification information associated with the product received thereby;

a memory for storing values corresponding to the first and second types of products and for storing the first processing information;

comparing circuitry coupled to the device and the memory for comparing the product identification information to the values to determine whether the product identification information is indicative of the first type of product or the second type of product;

a control unit coupled to the comparing circuitry for generating, in response to the comparing circuitry determining that the product identification information is indicative of the second type of product, a request for the second processing information; and a data port for transmitting the request and for receiving in response thereto the second processing information from the second line controller.

11. The manufacturing facility according to claim 10, wherein:

the first assembly line comprises equipment for processing the first and second types of products; and the first line controller comprises generation means for generating a set of instructions for transmission to the equipment, wherein the set of instructions conveys which of the first and second types of products is to be processed by the equipment on the first assembly line.

12. The manufacturing facility according to claim 6, wherein the second line controller comprises:

a device for reading product identification information associated with the product received thereby;

a memory for storing values corresponding to the first and second types of products and for storing the second processing information;

comparing circuitry coupled to the device and the memory for comparing the product identification information to the values to determine whether the product identification information is indicative of the first type of product or the second type of product;

a control unit coupled to the comparing circuitry for generating, in response to the comparing circuitry determining that the product identification information is indicative of the first type of product, a request for the first processing information; and a data port for transmitting the request and for receiving in response thereto the first processing information from the first line controller.

13. The manufacturing facility according to claim 12, wherein:

the second assembly line comprises equipment for processing the first and second types of products; and the second line controller comprises generation means for generating a set of instructions for transmission to the equipment, wherein the set of instructions conveys which of the first and second types of products is to be processed by the equipment on the second assembly line.

* * * * *